United States Patent
Willenegger et al.

(10) Patent No.: US 6,240,071 B1
(45) Date of Patent: *May 29, 2001

(54) SUBCHANNEL CONTROL LOOP

(75) Inventors: Serge Willenegger, Onnens (CH); Yu-Cheun Jou, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/353,895

(22) Filed: Jul. 15, 1999

Related U.S. Application Data

(62) Division of application No. 08/800,734, filed on Feb. 13, 1997, now Pat. No. 5,991,284.

(51) Int. Cl.$^7$ .............................. H04B 7/216; H04J 13/02
(52) U.S. Cl. ..................... 370/311; 370/335; 455/522; 455/69
(58) Field of Search ................... 370/206, 208, 370/252, 310, 311, 313, 328, 329, 335, 342, 441, 336, 337, 341, 347, 442; 455/69, 522, 103, 127, 38.1, 38.4, 501, 517, 63, 67.1, 68, 70

(56) References Cited

U.S. PATENT DOCUMENTS

| | | | |
|---|---|---|---|
| 3,310,631 | 3/1967 | Brown | 179/15 |
| 3,715,508 | 2/1973 | Blasbalg | 179/15 BC |
| 4,052,565 | 10/1977 | Baxter et al. | 179/1.5 S |
| 4,112,257 | 9/1978 | Frost | 179/2 EB |
| 4,123,718 | 10/1978 | Lampert et al. | 325/474 |
| 4,222,115 | 9/1980 | Cooper et al. | 375/1 |
| 4,225,976 | 9/1980 | Osborne et al. | 455/226 |
| 4,291,409 | 9/1981 | Weinberg et al. | 375/1 |
| 4,301,530 | 11/1981 | Gutleber | 370/18 |
| 4,460,992 | 7/1984 | Gutleber | 370/19 |
| 4,472,815 | 9/1984 | Gutleber | 375/34 |
| 4,495,648 | 1/1985 | Giger | 455/73 |
| 4,580,262 | 4/1986 | Naylor et al. | 371/5 |
| 4,635,221 | 1/1987 | Kerr | 364/821 |
| 4,641,322 | 2/1987 | Hasegawa | 375/1 |
| 4,672,658 | 6/1987 | Kaverad et al. | 379/63 |

(List continued on next page.)

FOREIGN PATENT DOCUMENTS

| | | | |
|---|---|---|---|
| 0412583 | 3/1986 | (EP) | H04B/1/56 |
| 0418865 | 9/1990 | (EP) | H04L/12/56 |
| 0444592 | 2/1991 | (EP) | H04B/7/212 |
| 0564937 | 10/1993 | (EP) | H04B/7/26 |
| 0682418 | 11/1995 | (EP) | . |
| 2022365 | 5/1979 | (GB) | H04Q/3/06 |
| 2182528 | 10/1986 | (GB) | H04J/3/16 |
| 2273009 | 6/1994 | (GB) | H03G/3/20 |
| 2300546 | 11/1996 | (GB) | . |
| 9107030 | 10/1990 | (WO) | H04J/3/06 |
| 9406218 | 3/1994 | (WO) | H04B/7/005 |
| 9519664 | 7/1995 | (WO) | . |
| 9604718 | 2/1996 | (WO) | . |

OTHER PUBLICATIONS

*Advanced Engineering Mathmatics*, "Orthogonal Sets of Functions/Chapter 4", Erwin Kreyszig, pp. 186–190, John Wiley & Sons, Inc.

Primary Examiner—Ricky Ngo
(74) Attorney, Agent, or Firm—Philip R. Wadsworth; Kent D. Baker; Byron Yafuso

(57) ABSTRACT

Independently controlling the transmitted power of each subchannel by a subchannel control loop is described. A transmitting station generates a channel made up of a sum of subchannels wherein each subchannel or group of subchannels is amplified with a unique gain value that is varied in accordance with subchannel power control messages from the receiving station. The receiving station generates each subchannel power control message subsequent to monitoring and calculating metrics based on that received subchannel.

6 Claims, 3 Drawing Sheets

U.S. PATENT DOCUMENTS

| | | | |
|---|---|---|---|
| 4,688,035 | 8/1987 | Gray et al. | 340/825.52 |
| 4,730,340 | 3/1988 | Frazier, Jr. | 375/1 |
| 4,765,753 | 8/1988 | Schmitdt | 379/60 |
| 4,813,040 | 3/1989 | Futato | 370/111 |
| 4,872,200 | 10/1989 | Jansen | 380/34 |
| 4,901,307 | 2/1990 | Gilhousen et al. | 370/18 |
| 4,933,952 | 6/1990 | Albrieux | 375/1 |
| 4,939,745 | 7/1990 | Kirimoto et al. | 375/1 |
| 5,003,533 | 3/1991 | Watanabe | 370/85.5 |
| 5,022,046 | 6/1991 | Morrow, Jr. | 375/1 |
| 5,029,331 | 7/1991 | Heichler et al. | 371/43 |
| 5,056,109 | 10/1991 | Gilhousen et al. | 375/1 |
| 5,068,849 | 11/1991 | Tanaka | 370/85.5 |
| 5,101,501 | 3/1992 | Gilhousen et al. | 455/33 |
| 5,103,459 | 4/1992 | Gilhousen et al. | 375/1 |
| 5,128,965 | 7/1992 | Henriksson | 455/69 |
| 5,136,586 | 8/1992 | Greenblatt | 370/110.4 |
| 5,157,672 | 10/1992 | Kondou et al. | 371/43 |
| 5,159,608 | 10/1992 | Falconer et al. | 375/1 |
| 5,204,876 | 4/1993 | Bruckert et al. | 375/1 |
| 5,212,684 | 5/1993 | MacNamee et al. | 370/24 |
| 5,220,678 | 6/1993 | Feei | 455/69 |
| 5,245,629 | 9/1993 | Hall | 370/1 |
| 5,258,983 | 11/1993 | Lane et al. | 370/118 |
| 5,263,050 | 11/1993 | Sutterlin et al. | 375/1 |
| 5,267,262 | 11/1993 | Wheatley, III | 375/1 |
| 5,283,780 | 2/1994 | Schuchman et al. | 370/50 |
| 5,299,229 | 3/1994 | Zscheile et al. | 375/1 |
| 5,305,468 | 4/1994 | Bruckert et al. | 455/69 |
| 5,383,219 | 1/1995 | Wheatley, III et al. | 375/1 |
| 5,390,338 | 2/1995 | Bodin et al. | 455/69 |
| 5,442,625 | 8/1995 | Gitlin et al. | 370/18 |
| 5,465,399 | 11/1995 | Oberholtzer et al. | 455/69 |
| 5,487,180 | 1/1996 | Ohtake | 455/69 |
| 5,570,353 * | 10/1996 | Keskitalo et al. | 370/252 |
| 5,579,373 * | 11/1996 | Jang | 455/69 |
| 5,710,982 * | 1/1998 | Laborde et al. | 455/69 |
| 5,930,684 * | 7/1999 | Keskitalo et al. | 455/69 |
| 5,991,284 * | 11/1999 | Willenegger et al. | 370/335 |
| 6,018,544 * | 1/2000 | Kotzin et al. | 375/206 |

* cited by examiner

SUBCHANNEL CONTROL LOOP

This is a divisional application of application Ser. No. 08/800,734, filed Feb. 13, 1997, now allowed, entitled "Subchannel Control Loop now U.S. Pat. No. 5,991,284.

BACKGROUND OF THE INVENTION

I. Field of the Invention

The present invention relates to communications systems. More particularly, the present invention relates to a novel and improved method for independent closed loop power control of subchannels in a spread spectrum communication system.

II. Description of the Related Art

In a code division multiple access (CDMA) spread spectrum communication system, a common frequency band is used for communication with all base stations within that system. An example of such a system is described in the TIA/EIA Interim Standard IS-95-A entitled "Mobile Station-Base Station Compatibility Standard for Dual-Mode Wideband Spread Spectrum Cellular System", incorporated herein by reference. The generation and receipt of CDMA signals is disclosed in U.S. Pat. No. 4,401,307 entitled "SPREAD SPECTRUM MULTIPLE ACCESS COMMUNICATION SYSTEMS USING SATELLITE OR TERRESTRIAL REPEATERS" and in U.S. Pat. No. 5,103,459 entitled "SYSTEM AND METHOD FOR GENERATING WAVEFORMS IN A CDMA CELLULAR TELEPHONE SYSTEM" both of which are assigned to the assignee of the present invention and incorporated herein by reference.

Signals occupying the common frequency band are discriminated at the receiving station through the spread spectrum CDMA waveform properties based on the use of a high rate pseudonoise (PN) code. A PN code is used to modulate signals transmitted from the base stations and the remote stations. Signals from different base stations can be separately received at the receiving station by discrimination of the unique time offset that is introduced in the PN codes assigned to each base station. The high rate PN modulation also allows the receiving station to receive a signal from a single transmission station where the signal has traveled over distinct propagation paths. Demodulation of multiple signals is disclosed in U.S. Pat. No. 5,490,165 entitled "DEMODULATION ELEMENT ASSIGNMENT IN A SYSTEM CAPABLE OF RECEIVING MULTIPLE SIGNALS" and in U.S. Pat. No. 5,109,390 entitled "DIVERSITY RECEIVER IN A CDMA CELLULAR TELEPHONE SYSTEM", both of which are assigned to the assignee of the present invention and incorporated herein by reference.

The IS-95 Over-the-Air (OTA) Interface Standard defines a set of RF signal modulation procedures for implementing a digital cellular telephone system. The IS-95 standard, and its derivatives, such as IS-95A and ANSI J-STD-008 (referred to collectively as the IS-95 standard), are promulgated by the Telecommunications Industry Association (TIA) to insure the operability between telecommunications equipment manufactured by different vendors.

The IS-95 standard has received enthusiastic reception because it uses the available RF bandwidth more efficiently than previously existing cellular telephone technologies. This increased efficiency is provided by using CDMA signal processing techniques in combination with extensive transmit power control to increase the frequency reuse of a cellular telephone system.

FIG. 1 illustrates a digital cellular telephone system configured in a manner consistent with the use of IS-95. During operation, telephone calls and other communications are conducted by exchanging data between remote stations 1 (generally cellular telephones) and base stations 2 using RF signals. Communications are further conducted from base stations 2 through base station controllers (BSC) 4 and mobile switching center (MSC) 6 to either public switch telephone network (PSTN) 8, or to another base station for transmission to another remote station 1. BSCs 4 and MSC 6 typically provide mobility control, call processing, and call routing functionality.

The RF signal transmitted from a base station 2 to a set of remote stations 1 is referred to as the forward link, and the RF signal transmitted from remote stations 1 to a base station 2 is referred to as the reverse link. The IS-95 standard calls for remote stations 1 to provide telecommunications service by transmitting user data such as digitized voice data via the reverse link signal. The reverse link signal is comprised of a single traffic channel, and therefore is often referred to as a "non-coherent" signal because it does not include a pilot channel, and as such cannot be coherently demodulated.

Within the reverse link signal, user data is transmitted at a maximum data rate of 8.6 or 13.35 kbps, depending on which rate set from a set of rate sets provided by IS-95 is selected. The use of a single channel, non-coherent, reverse link signal simplifies the implementation of an IS-95 cellular telephone system by eliminating the need for synchronization between a set of remote stations 1 communicating with a single base station 2.

As mentioned above, IS-95 incorporates extensive transmit power control in order to more efficiently utilize the available RF bandwidth. In accordance with IS-95, this power control is performed by measuring the received signal strength and quality of the reverse link traffic channel when received at the base station and generating a power control command based on that measurement. The power control command is transmitted to the remote station via the forward link signal. The remote station responds to the power control command by increasing or decreasing the transmit power of the reverse link signal based on the power control command. This power control method is referred to as closed loop power control. The design of closed loop power control in a CDMA communication system is described in U.S. Pat. No. 5,056,109, entitled "METHOD AND APPARATUS FOR CONTROLLING TRANSMISSION POWER IN A CDMA CELLULAR MOBILE TELEPHONE SYSTEM", which is assigned to the assignee of the present invention and incorporated by reference herein.

In IS-95 systems, the power control adjustment is performed repeatedly at rates on the order of 800 times per second in order to maintain the reverse link signal transmit power at the minimum necessary to conduct communications. Additionally, IS-95 also calls for transmit duty cycle of the reverse link signal to be adjusted in response to changes in voice activity by varying the transmit duty cycle in 20 millisecond increments. Thus, when the transmit duty cycle is lowered, the remote station transmits at either the set point, or the transmission is gated and the remote station does not transmit at all. During periods when the transmission is gated, the base station generates false power control increase commands because the reverse link signal is not detected. Since the remote station knows when its transmissions were gated, it can ignore corresponding increase commands since they are known to be false.

To satisfy the ever increasing demand to transmit digital data created by networking technologies, such as the worldwide web, a more complex higher rate multi-channel coherent reverse link signal is provided in co-pending U.S. Pat. No. 5,930,230 (the '230 Patent) entitled "High Data Rate CDMA Wireless Communications System" issued Jul. 27, 1999, assigned to the assignee of the present invention and incorporated herein by reference. The above referenced patent describes a system wherein a set of individually gain adjusted channels are formed via the use of a set of orthogonal subchannel codes. Data to be transmitted via one of the transmit channels is modulated with one of the subchannel codes, gain adjusted, and summed with data modulated using the other subchannel codes. The resulting summed data is modulated using a user long code and a pseudorandom spreading code (PN code) and upconverted for transmission. In particular, the above referenced patent describes a reverse link signal made up of Walsh sequence modulated subchannels including at least one traffic subchannel, a power control subchannel, and a pilot subchannel.

A multi-channel reverse link increases flexibility by allowing different types of data to be transmitted simultaneously. Providing a pilot subchannel facilitates coherent processing of the reverse link signal at the base station which improves the performance of the link. To facilitate power control, time tracking and frequency tracking, it may be desirable to keep the average received pilot signal power to noise ratio (SNR) at a constant level. Note that in a CDMA based system, effective power control is essential to achieving a high system capacity. Usually, power control is divided into two parts, an open loop and a closed loop. In open loop power control, the mobile station measures the received forward link signal for a predetermined time period and adjusts its transmit power in response to changes in the received forward link power. The open loop power control as implemented in IS-95 systems is fairly slow and takes care of the long term channel variations (known as the corner effect). The closed loop power control as described previously is faster and tries to compensate for the effects of fading.

In IS-95 based CDMA systems, the closed loop power control is also used to drive the reverse link to a desired setpoint. For example, a frame error rate (FER) of 1% may be desired. If the FER is too low, an increase in reverse link power is necessary to reduce the error rate. On the other hand, if the FER is lower than the desired setpoint, the reverse link power can be reduced. Reducing the reverse link power reduces interference generated and thus has a direct positive effect on the other users in the system. Maximum capacity is reached in a CDMA system when every user is transmitting at the setpoint and therefore the minimum power required to achieve the desired error rate.

The operating setpoint of the system can be modified by changing the power control decision threshold at the base station. As a consequence, the total average received power of the reverse link will converge to a new value. This power control mechanism affects the total transmitted power. However, if this technique is applied to a system employing a plurality of subchannels as provided for in the '230 Patent, the relative strengths of each subchannel are not changed as the total transmit power is modified. For example, upon reaching a satisfactory power level in terms of received pilot subchannel power, any subsequent variation of transmit power to modify the received FER for a data subchannel will affect the pilot power, and vice versa. Since it is likely that different types of data which occupy separate subchannels will have different requirements, it is desirable to be able to control the transmitted power of each subchannel independently.

SUMMARY OF THE INVENTION

Independently controlling the transmitted power of each subchannel by a subchannel control loop is described. A transmitting station generates a channel made up of a sum of subchannels wherein each subchannel or group of subchannels is amplified with a unique gain value that is varied in accordance with subchannel power control messages from the receiving station. The receiving station generates each subchannel power control message subsequent to monitoring and calculating metrics based on that received subchannel.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

In the exemplary embodiment of the present invention, the subchannel control loop controls the reverse link. Therefore, the transmitting station will be referred to as the remote station and the receiving station will be referred to as the base station. Remote stations may include wireless local loop stations, portable telephones, data terminals, and the like. It is understood that this invention could also be employed on the forward link alone or on both forward and reverse links simultaneously.

In a channel containing N subchannels, the total transmitted power by a remote station, $P_{tot}$, is defined as the sum of the transmitted powers of each subchannel:

$$P_{tot} = P_0 + P_1 + \ldots + P_N \quad (1)$$

In the present invention, a remote station can change the setpoint of a particular subchannel, subchannel i, by changing the corresponding subchannel transmitted power $P_i$ while the operating points of the other subchannels remain unchanged.

Equation (1) can be normalized by an arbitrary power $P_{ref}$:

$$P_{tot} = (F_0 + F_1 + \ldots + F_N) * P_{ref} \quad (2)$$

In the exemplary embodiment, power control is accomplished by adjusting transmit power $P_{ref}$. Each subchannel control loop operates by adjusting a specific one or subset of $F_i$.

Figure 2:
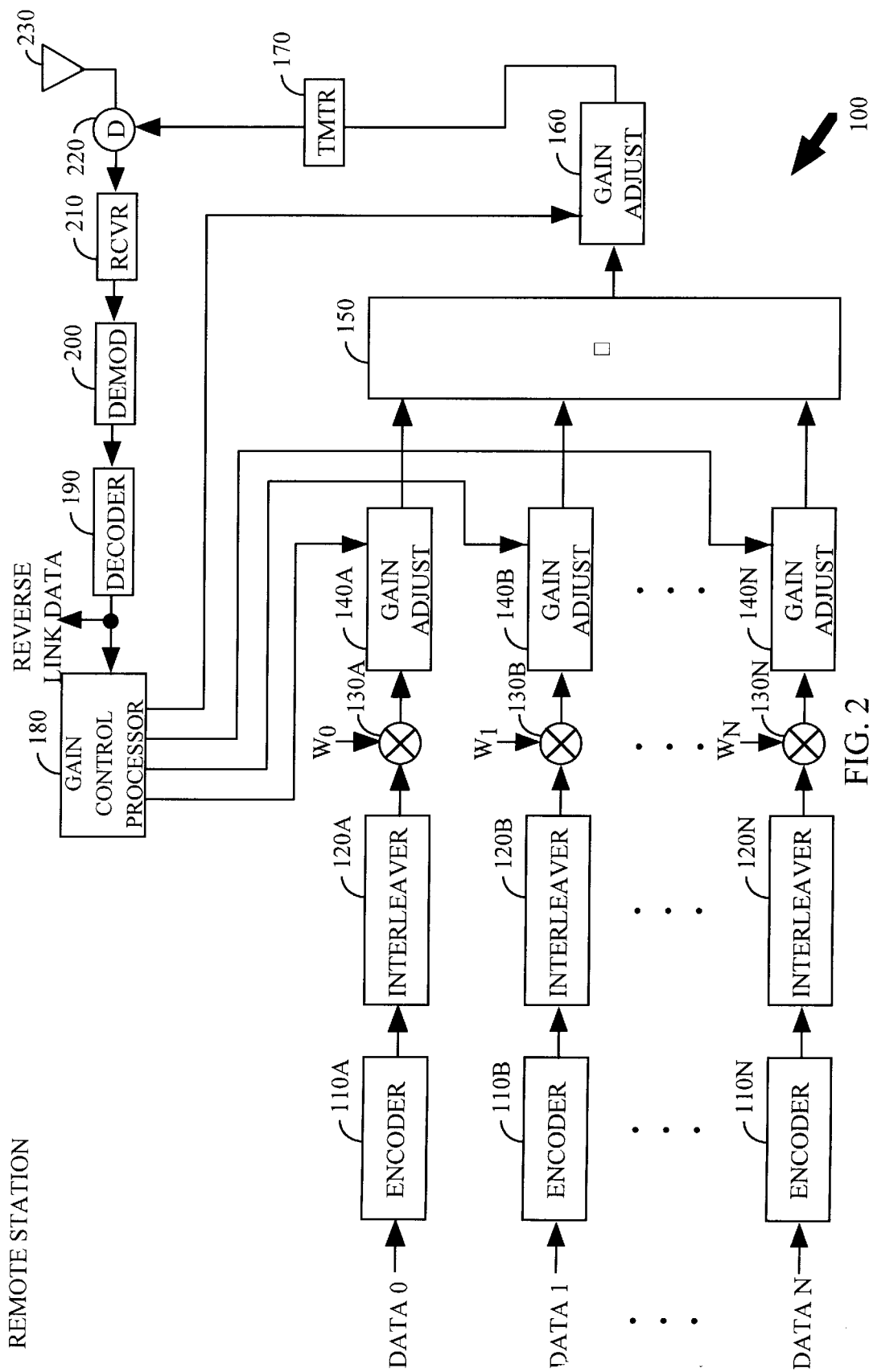
FIG. 2 is a block diagram of a remote station configured in accordance with an exemplary embodiment of the present invention.

FIG. 2 depicts an exemplary remote station. In remote station 100, a plurality of data signals data0–dataN enter encoders 110A–110N. The encoded results are interleaved in interleavers 120A–120N, then modulated by unique Walsh sequences $W_0$–$W_N$ in multipliers 130A–130N. The outputs of multipliers 130A–130N are amplified in gain adjust blocks 140A–140N with unique gain values supplied from gain control processor 180. Gain adjust blocks 140A–140N may use digital techniques or may be implemented using variable gain amplifiers. The design of both techniques is known in the art.

In the exemplary embodiment, Walsh sequence 0 ($W_0$) modulates a constant value to form a pilot signal. As such, in the exemplary embodiment the data input to multiplier 130A is fixed and encoder 110A and interleaver 120A are not needed. The gain adjusted signals are combined in summer 150. Summer 150 may be implemented as a digital or analog device. Although summer 150 is likely to be digital if gain adjust blocks 140A–140N are digital, and analog if they are analog, it is not necessary to do so. The signal made up of the sum of the individually gain adjusted data signals is amplified in gain adjust block 160 with a gain value supplied by gain control processor 180. In the exemplary embodiment, gain adjust block 140A is not required, since pilot gain adjustments can be accomplished via gain adjust block 160. Alternatively, gain adjust block 160 can be eliminated if the overall gain is factored into each of the subchannel gains. In either case, no loss of control is suffered since each subchannel gain as well as the overall signal gain can still be independently varied. The resultant signal from gain adjust block 160 is modulated and upconverted in transmitter 170 and then transmitted on antenna 230 through duplexer 220. As with the other gain adjust blocks, gain adjust 160 can be implemented using digital or analog techniques.

Forward link data from the base station, including the power control message information, is downconverted and amplified in receiver 210 via antenna 230 through duplexer 220. The received signal is demodulated in demodulator 200, then deinterleaved and decoded in decoder 190. In the exemplary embodiment, demodulator 200 is a CDMA demodulator as described in the aforementioned U.S. Pat. Nos. 4,401,307 and 5,103,459. Subchannel power control messages from the base station are separated from the forward link data decoded by decoder 190 in gain control processor 180.

These messages independently control the gain values in gain adjust blocks 140A–140N and 160. There are a number of ways for the gain values to be adjusted. For example, the subchannel power control message can consist of N bits, wherein each of the N bits directs a corresponding subchannel to increase or decrease its transmitted power. In response to this message, each gain value is increased or decreased by a predetermined amount that can be used for all subchannels or can be unique for each subchannel. Alternatively, the subchannel power control message can contain N binary sequences indicating the gain values or indicating the amount of change to the gain values. The control messages can independently control each gain value or a group of gain values, and can employ a combination of techniques for each.

Figure 3:
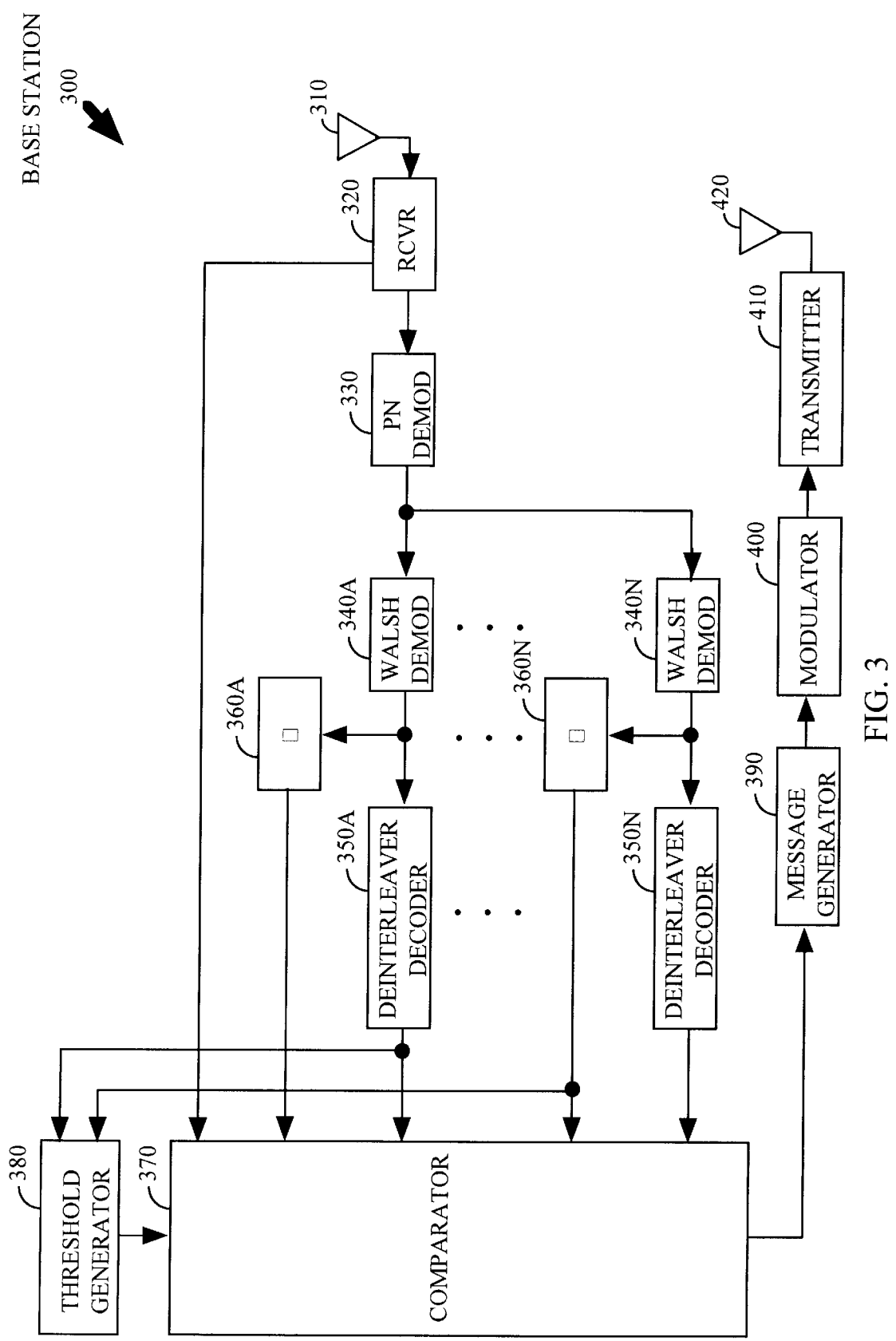
FIG. 3 is a block diagram of a base station configured in accordance with an exemplary embodiment of the present invention.

FIG. 3. depicts an exemplary base station. In base station 300, a signal containing the sum of all transmitted signals from remote stations operating in the system enters through antenna 310 and is downconverted and amplified in receiver 320. PN demodulator 330 extracts the set of signals transmitted by a particular remote station, remote station 100 for example. The PN demodulated signal is directed to a plurality of Walsh demodulators 340A–340N. Each Walsh demodulator demodulates a corresponding subchannel of the signal sent by remote station 100.

In the exemplary embodiment, the subchannels as demodulated by Walsh demodulators 340A–340N can be deinterleaved and decoded in decoders 350A–350N. The data from decoders 350A–350N is delivered to comparator 370. A useful metric for comparator 370 to calculate is that of frame error rate (FER). The frame error rate of each subchannel can be compared to a FER threshold for that subchannel as provided by threshold generator 380. If the frame error rate of a subchannel is lower than necessary for the desired communication quality, the power in that subchannel can be reduced. Conversely, if the frame error rate of a subchannel is too high, that subchannel needs to have its power increased.

In an alternative embodiment, the energy in each subchannel signal is summed in accumulators 360A–360N. The energy results are delivered to comparator 370. Receiver 320 typically contains automatic gain control circuitry (AGC), which normalizes the in-band energy to a predetermined level. Parameters associated with the AGC can be delivered to comparator 370 to assist in normalizing energy values for comparison. Comparator 370 compares the energy received in each subchannel with an energy threshold for that channel as determined by threshold generator 380. The energy thresholds are calculated to ensure a certain quality of service on the respective subchannel. Each subchannel's power can be adjusted based on the comparison. The power can be reduced if the threshold is exceeded and reduced if the threshold is not exceeded. Moreover, the two embodiments can work in conjunction with one another by permitting the energy thresholds to be varied in response to the frame error rate or other signal quality metric.

Figure 1:
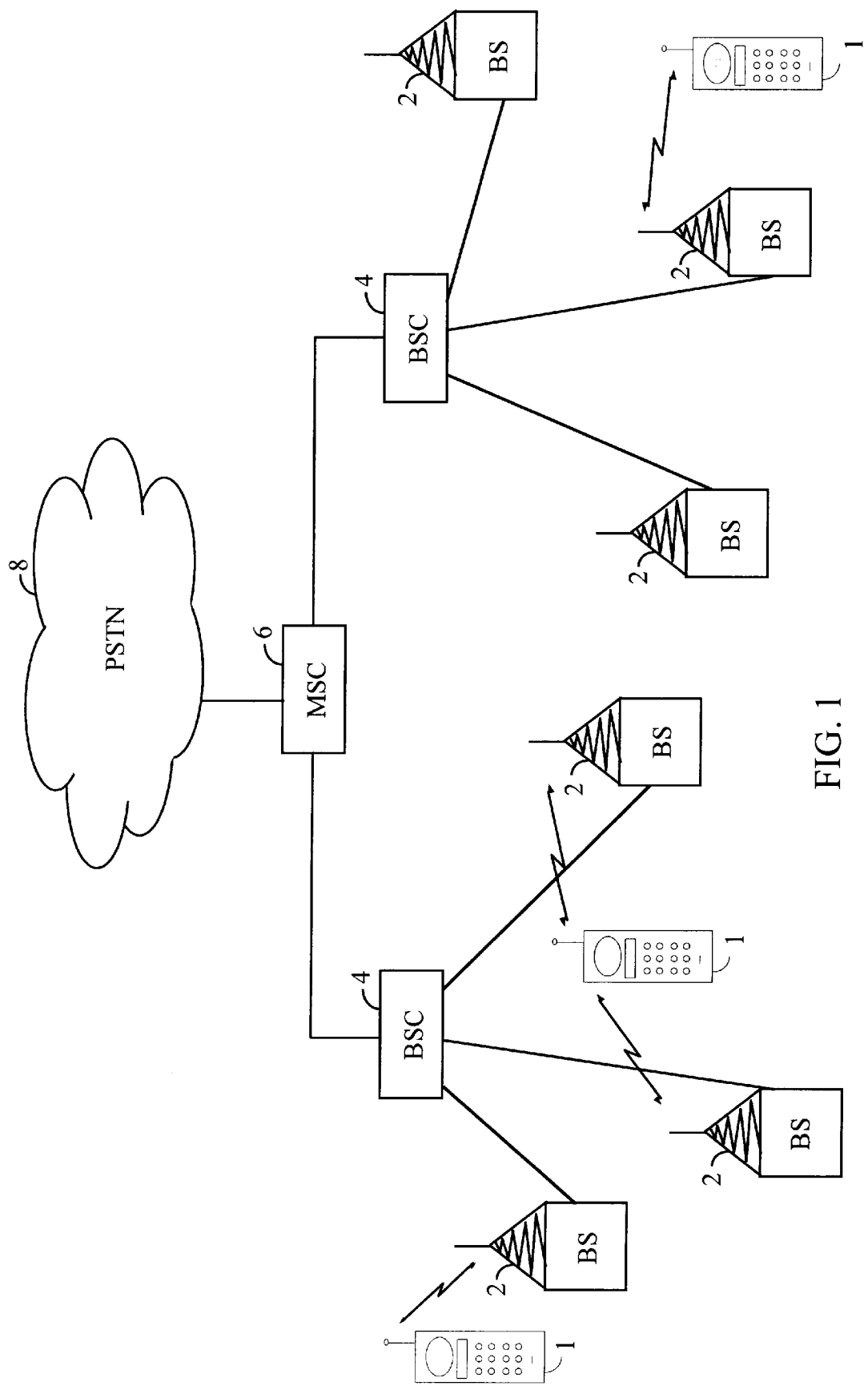
FIG. 1 is a block diagram of a cellular telephone system.

Many other alternatives are envisioned for comparison in comparator 370. When decoders 350A–350N use the Viterbi algorithm, Viterbi decoder metrics can be provided for comparison. Further examples include comparison of symbol error rate instead of frame error rate and computation of a cyclic redundancy check (CRC). The thresholds can be signaled to threshold generator 380 by base station controller 4 as shown in FIG. 1, or they can be calculated in threshold generator 380 itself.

In the exemplary embodiment, comparator 370 makes a determination based on the received subchannels whether or not to increase or decrease the power level of each of the subchannels. Based on that determination, message generator 390 creates a power control message to be sent to the remote station to modify any subchannels, if necessary. The power control messages can be transmitted as signaling data or punctured into the data stream as described in IS-95, or any other method of signaling capable of relaying the message to the mobile station. As discussed previously, the message can be a simple up or down command per subchannel or as complicated as sending the exact gain values for each. Furthermore, each subchannel can be controlled independently, or alternatively, subchannel power control messages can control groups of subchannels. The power control message is modulated in modulator 400, upconverted and amplified in transmitter 410 and transmitted to remote station 100 via antenna 420. Remote station 100 modifies the gain value associated with each subchannel as described previously, and thus the subchannel control loop is closed.

In an alternative embodiment, the gain values for gain adjust blocks 140A–140N can be calculated in an open loop manner. A predetermined gain calculation algorithm in gain control processor 180 can be used to calculate the individual gain adjust values based on the received energy of the forward link signal. For example, different subchannels are likely to have different coding for error correction and thus the error rates will vary for a given drop in received power due to a fade. Empirical studies can be used to develop the predetermined gain calculation algorithm.

In another alternative embodiment, if both forward and reverse links employ this invention, open loop calculations of received energy of a forward link subchannel can be used to adjust the gain of a corresponding reverse link subchannel, and vice versa. In situations where there is symmetry or partial symmetry with respect to the forward and reverse links, the received energy in a subchannel can be used in calculations for determining the power level of the corresponding transmit subchannel. A combination of open and closed loop techniques can also be employed.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. In a wireless communication system in which a remote station transmits a reverse link signal comprising a plurality of subchannel signals, a power control subsystem located in a base station for independently adjusting the transmission power of each of said plurality of subchannel signals, comprising:

receiver means for receiving said reverse link signal and demodulating said reverse link signal to provide said plurality of subchannel signals;

quality measurement means for receiving each of said plurality of subchannel signals and for measuring the quality of each of said subchannel signals; and message generator means for generating a power control message for adjusting the transmit power of at least one of said plurality of subchannel signals.

2. The power control system of claim 1 further comprising:

a modulator for modulating said power control message in accordance with a modulation format.

3. In a wireless communication system in which a remote station transmits a reverse link signal comprising a plurality of subchannel signals wherein a remote station power control subsystem independently adjusts the transmit power of each said subchannel signal based upon a received power control message, said power control subsystem comprising:

receiver means for receiving said power control message and for providing a plurality of gain values based on said power control message; and a plurality of gain adjust means, each o said gain adjust means for receiving a corresponding subchannel signal and a corresponding gain value and adjusting the gain of said subchannel signal in accordance with said gain value.

4. A method of controlling transmit power of a remote station which transmits a reverse link signal comprising a plurality of subchannel signals, said method comprising:

receiving said reverse link signal;

demodulating said reverse link signal to obtain said plurality of subchannel signals;

generating a power control message for use in adjusting the transmit power of at least one of said plurality of subchannel signals in accordance with a quality measurement or an energy measurement associated with a corresponding one of said subchannel signals;

transmitting said power control message to the remote station; and controlling the transmit power of said at least one of said plurality of subchannel signals in accordance with said power control message.

5. The method of claim 4 wherein the step of generating generates a power control message for use in adjusting the transmit power of a plurality of said subchannel signals; and independently controlling the transmit power of said plurality of subchannel signals in accordance with said power control message.

6. A method of controlling transmit power of a remote station which transmits a reverse link signal comprising a plurality of subchannel signals, wherein the transmit power of one or more of said plurality of subchannel signals is independently adjusted based upon a received power control message, said method comprising:

receiving said power control message;

obtaining one or more gain values from said power control message; and receiving a corresponding subchannel signal and a corresponding gain value at one or more of a plurality of gain adjusters and independently adjusting the gain of each subchannel signal in accordance with said gain value.

* * * * *